United States Patent [19]

Albertinetti

[11] 4,280,756
[45] Jul. 28, 1981

[54] PIEZOELECTRIC BI-MORPH MIRROR ACTUATOR

[75] Inventor: Nedo P. Albertinetti, Canton, Mass.
[73] Assignee: Itek Corporation, Lexington, Mass.
[21] Appl. No.: 217
[22] Filed: Jan. 2, 1979
[51] Int. Cl.³ .............................................. G02F 1/29
[52] U.S. Cl. ................................................... 350/360
[58] Field of Search ........................................ 350/360

[56] References Cited

U.S. PATENT DOCUMENTS 4,016,415  4/1977  O'Meara .............................. 350/360

OTHER PUBLICATIONS

Adelman, Spherical Mirror with Piezoelectrically Controlled Curvature, Applied Optics, vol. 16, No. 12 (Dec. 1977), pp. 3075-3077.
McElroy et al, Laser Tuners Using Circular Piezoelectric Benders, Applied Optics, vol. 14, No. 6 (Jun. 1975), pp. 1297-1302.

*Primary Examiner*—William L. Sikes
*Attorney, Agent, or Firm*—Homer O. Blair; Robert L. Nathans; Gerald H. Glanzman

[57] ABSTRACT

A piezoelectric wavefront modulator is disclosed having mirror actuators including a first and second layer of piezoelectric material, both internally polarized in a given direction, together with electrode means for increasing the internal electric field in one layer while decreasing the internal electric field in the other layer. As the layers are clamped to the modulator support elements at opposite edges, the degree of bending of the layers may be carefully controlled to cause pusher elements to actuate a mirror, which mirror is oriented parallel to the major surfaces of the top layer of piezoelectric material.

9 Claims, 2 Drawing Figures

PIEZOELECTRIC BI-MORPH MIRROR ACTUATOR

DESCRIPTION

TECHNICAL FIELD

This invention relates to the field of modulating wavefronts of light.

BACKGROUND ART

Early wavefront phase modulators employ a number of discrete drivers, such as electromechanical and piezoelectric transducers. U.S. Pat. No. 3,742,234 to Laakmann discloses various devices of this type. FIGS. 5–7 illustrate stacks of piezoelectric elements, which are deformed by applying various voltages thereto, to in turn, cause deformation of a mirror. The systems constructed in accordance with the teachings of this patent are stable to only one wavelength of visible light and are incapable of correcting fractions of wavelengths or electromagnetic radiation having shorter wavelengths than those of visible light. In contrast, the Feinleib et al. U.S. Pat. No. 3,904,274, incorporated by reference herein, teaches monolithic devices, which are far simplier to fabricate and are far more stable. Additionally, they have uniformity of the piezoelectric coefficient from point to point, since the material is formed from one wafer. Their stability produces far more accurate control, in contrast with the discrete actuators of the '234 patent.

Another device of this nature is the subject of U.S. Patent Application Ser. No. 970,055, Filed Dec. 14, 1978, in the names of Nedo Peter Albertinetti and Ralph Edward Aldrich, entitled "A Multiple Layer Peizoelectric Wavefront Modulator". The device disclosed in said patent application employs a number of layers of piezoelectric material bonded together, each layer being internally polarized in a direction opposite to the next adjacent layer. This device, in contrast with the device of the Feinleib patent, advantageously may employ driver voltages in the neighborhood of 500 volts. It is the object of this invention to maintain the low voltage advantage of the multiple layer device of the above-mentioned patent application, and yet increase the sensitivity of the device.

The bender Bi-Morph concept, which is utilized in the present invention, is a subject of an article entitled "Bender Bi-Morph Scanner Analysis" by J. J. Schaffer and D. L. Fried, published in Applied Optics, Volume 9, No. 4, dated April 1970, commencing on Page 933. As is indicated by FIG. 1 of the article, the application of an electric field across the T dimension of a two layer element will cause the lengthening of one layer and the shortening of the other to produce a bending effect, to in turn, induce tilting of a mirror element mounted upon the free end of the two layer element. In contrast with the present invention, major surfaces of the layers are not parallel to the mirror surfaces and are not clamped to a support device at opposite non-centralized portions, which produces a high mechanical advantage which is highly beneficial for use in wavefront modulators.

DISCLOSURE OF THE INVENTION

SUMMARY OF THE INVENTION

The above objects are beneficially obtained by constructing mirror actuators having first and second piezoelectic layers bonded to each other via a first electrode, which is sandwiched between the two layers. Non-centralized portions of the sandwich are clamped to support means and second and third electrodes are bonded to the outer surfaces of the first and second layers. In contrast with the above-mentioned multiple layer wavefront modulator, adjacent layers are internally polarized in the same direction, so that, as the strength of the electric fields set up between the inner electrode and the outer electrodes vary, the centralized portions of the sandwich will bend to a greater or lesser extent, to in turn, induce displacement of the mirror mounted to the upper portion of the top layer, and high sensitivities are produced without the use of relatively high control voltages. A single actuator may be employed as a focus control device or an array of them may be employed to control an active mirror.

DETAILED DESCRIPTION

Figure 1:
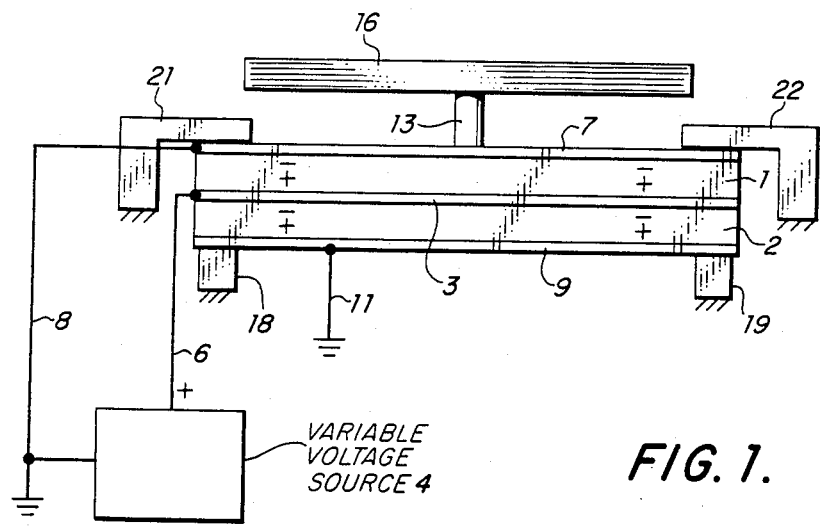
FIG. 1 illustrates a side view of a preferred actuator of the invention.
Figure 2:
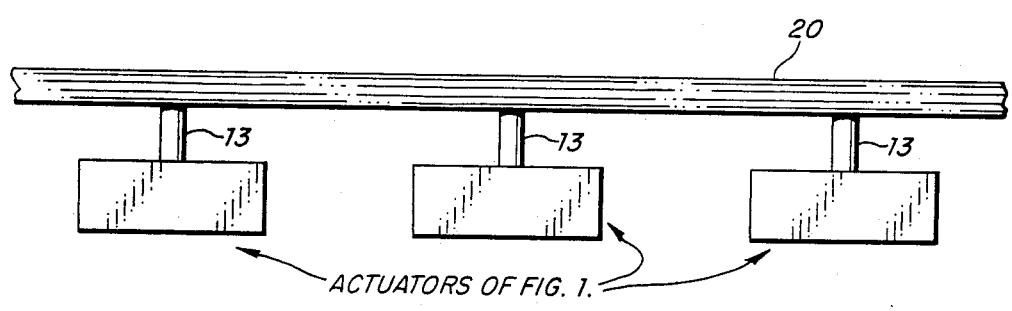
FIG. 2 illustrates how an array of such actuators may be employed in a larger active mirror.

In FIG. 1, first and second layers of piezoelectric material 1 and 2 are bonded together at an interface, which includes a first electrode 3 extending throughout major portions of the inner facing surfaces of the separate layers. Inner electrode 3 is electrically coupled to a variable voltage control source 4 via lead 6. A similar electrode 7 is formed upon the second surface of the first layer and is coupled to the second grounded terminal of voltage control source 4 via lead 8. A third electrode 9 is bonded upon the second surface of the second layer 2, as shown in the drawing, and is also electrically connected to the second grounded terminal of voltage source 4 via lead 11. An elongated mirror driver or pusher element 13 is coupled between mirror means 16 and the upper electrode 7. The non-centralized portions of the sandwich are supported by support means 18 and 19 and are clamped thereto by clamp means 21 and 22 respectively. The layers 1 and 2 are internally polarized in the same direction prior to assembly of the device, as indicated by the plus and minus signs in FIG. 1. Changes in the voltage between the central electrode 3 and the outer grounded electrodes 7 and 9 will cause one layer to lengthen and the other layer to shorten, thereby to change the degree of bending of the device, to in turn, induce a desired change in the degree of displacement of mirror means 16. A number of actuators of FIG. 1 may be employed (FIG. 2), to selectively alter the shape of an active mirror 20, to correct dynamic distortions in a telescope, for example. Obviously, a two dimensional array may be employed, and the various actuators may be oriented in various directions as desired. This arrangement enables the production of wavefront modulators having very high mechanical advantages, to in turn, produce a substantially greater degree of mirror deformation, with use of relatively low control voltages, in contrast with the prior art. In one embodiment, two strips of piezoelectric material $\frac{3}{8}"\times1\frac{1}{2}"\times0.05"$ thick, epoxied together, were capable of deforming a glass mirror 0.09" thick when 500 volts were applied to the conductive electrodes.

BEST MODE FOR CARRYING OUT THE INVENTION

The most preferred embodiment constructed to date employed piezoelectric material of lead zirconate titanate (PZT) having the above-mentioned dimensions.

INDUSTRIAL APPLICABILITY

A single actuator may be employed as a focusing device, whereas an array of the actuators of the invention (FIG. 2) may be used to correct dynamic distortion in optical images such as those viewed by telescopes through atmospheric turbulence. An array of fifty actuators were employed to drive a glass mirror to effect modulation of the wavefront striking the mirror by selectively varying the voltages applied by fifty electronic driver circuits, each associated with a particular actuator.

It should be understood that other components and configurations may be substituted for those described in order to practice the invention, and the invention is to be limited only by the permissable scope of the following claims. References are made in the claims to the numbered components in the described embodiments, and it should be understood that the claims are not to be restricted to such embodiments, as the numbers employed in the claims are merely exemplary of the nature of the claimed means.

I claim:

1. A piezoelectric wavefront modulator actuator comprising:
   a. a first layer of a piezoelectric medium (1) internally polarized in a given direction and having a first and second surface;
   b. a second layer of a piezoelectric medium (2) mechanically coupled to said first layer and having a first and second surface, also internally polarized in said given direction;
   c. a plurality of electrodes (3, 7, 9);
   d. a mirror (16);
   e. a driver (13) coupled between a centralized portion of said first layer and said mirror;
   f. a variable voltage control source (4);
   g. a support (18, 19);
   h. means (21, 22) for clamping opposite non-centralized portions of said first and second layers to said support; and
   i. means (6, 8, 11) for electrically coupling said variable voltage control source to said a plurality of electodes for increasing the internal electric field in one layer while decreasing the internal electric field in the other layer for changing the degree of bending of said actuator, thereby to control the degree of displacement of said mirror.

2. A piezoelectric wavefront modulator actuator comprising:
   a. a first layer of a piezoelectric medium (1) internally polarized in a given direction and having a first and second surface;
   b. a second layer of a piezoelectic medium (2) bonded to said first layer and having a first and second surface, also internally polarized in said given direction;
   c. a first electrode (3) positioned between the inner facing first surfaces of said first and second layers of piezoelectric material;
   d. a second electrode (7) coupled to the second surface of said first layer of piezoelectric material opposite said first surface thereof;
   e. a third electrode (9) coupled to the second surface of said second layer of piezoelectric material opposite said first surface thereof;
   f. a mirror (16);
   g. driver means (13) coupled to said second electrode at a first terminal portion of said driver and coupled to said mirror at a second terminal portion of said driver opposite said first terminal portion;
   h. a variable voltage control source (4);
   i. a support (18, 19);
   j. means (21, 22) for clamping opposite non-centralized portions of said first and second layers to said support; and
   k. means (6, 8, 11) for electrically coupling said variable voltage control source to said first, second and third electrodes for increasing the internal electric field in one layer while decreasing the internal electric field in the other layer for changing the degree of bending of said actuator, thereby to control the degree of displacement of said mirror.

3. The combination as set forth in claim 2, wherein said driver means is coupled to said second electrode at centralized portions thereof.

4. A piezoelectric wavefront modulator actuator comprising:
   a. a first layer of a piezoelectric medium (1) internally polarized in a given direction and having a first and second surface;
   b. a second layer of a piezoelectric medium (2) bonded to said first layer and having a first and second surface, also internally polarized in said given direction;
   c. a first electrode (3) positioned between the inner facing first surfaces of said first and second layers of piezoelectric material;
   d. a second electrode (7) coupled to the second surface of said first layer of piezoelectric material opposite said first surface thereof;
   e. a third electrode (9) coupled to the second surface of said second layer of piezoelectric material opposite said first surface thereof;
   f. a mirror (16) having surface portions substantially parallel to the surface portions of said first and second layers;
   g. a mirror driver (13) coupled to said second electrode at a first terminal portion of said mirror driver and coupled to said mirror at a second terminal portion of said mirror driver opposite said first terminal portion;
   h. a variable voltage control source (4) having a first and second output terminal;
   i. a support (18, 19);
   j. means (21, 22) for clamping opposite non-centralized portions of said first and second layers to said support; and
   k. means (6, 8, 11) for electrically coupling said variable voltage control source to said first, second and third electrodes for increasing the internal electric field in one layer while decreasing the internal electric field in the other layer for changing the degree of bending of said actuator, thereby to control the degree of displacement of said mirror.

5. The combination as set forth in claim 4, wherein said mirror driver is coupled to said second electrode at centralized portions thereof.

6. A piezoelectric wavefront modulator actuator comprising:
   a. a first layer of a piezoelectric medium (1) internally polarized in a given direction and having a first and second surface;
   b. a second layer of a piezoelectric medium (2) bonded to said first layer and having a first and second surface, also internally polarized in said given direction;
   c. a first electrode (3) positioned between the inner facing first surfaces of said first and second layers of piezoelectric material;
   d. a second electrode (7) coupled to the second surface of said first layer of piezoelectric material opposite said first surface thereof;
   e. a third electrode (9) coupled to the second surface of said second layer of piezoelectric material opposite said first surface thereof;
   f. a mirror (16) having surface portions substantially parallel to the major surface portions of said first and second layers;
   g. a mirror driver (13) coupled to said second electrode at a first terminal portion of said mirror driver and coupled to said mirror at a second terminal portion of said mirror driver opposite said first terminal portion;
   h. a variable voltage control source (4) having a first and second output terminal;
   i. a support (18, 19);
   j. means (21, 22) for clamping opposite non-centralized portions of said first and second layers to said support;
   k. means (6, 8, 11) for electrically coupling said first electrode to said first terminal of said variable voltage control source and for electrically coupling said second and third electrodes to said second terminal of said variable voltage control source, so that, as the voltage between said first electrode, and said second and third electrodes vary, the degree of displacement of said mirror will vary in response thereto.

7. The combination as set forth in claim 6, wherein said mirror driver is coupled to said second electrode at centralized portions thereof.

8. A piezoelectric wavefront modulator actuator comprising:
   a. a first layer of a piezoelectric medium (1) internally polarized in a given direction and having a first and second surface;
   b. a second layer of a piezoelectric medium (2) mechanically coupled to said first layer and having a first and second surface, also internally polarized in said given direction;
   c. a mirror (16);
   d. a driver (13) coupled between a centralized portion of said first layer and said mirror;
   e. a support (18, 19);
   f. means (21, 22) for clamping opposite non-centralized portions of said first and second layers to support; and
   g. control means (4, 6, 8, 11) for increasing the internal electric field in one layer while decreasing the internal electric field in the other layer for changing the degree of bending of said actuator, thereby to control the degree of displacement of said mirror.

9. A piezoelectric wavefront modulator comprising an array of said actuators of claims 1, 2, 3, 4, 5, 6, 7, or 8, coupled to a unitary mirror.

* * * * *